United States Patent [19]

Robinet et al.

[11] Patent Number: 4,937,558

[45] Date of Patent: Jun. 26, 1990

[54] FLOW FAILURE DETECTOR

[75] Inventors: Alain Robinet, Toulouse; Didier Thomas, Saint Martory, both of France

[73] Assignee: Societe Nationale Elf Aquitaine (Production), Courbevoie, France

[21] Appl. No.: 318,516

[22] Filed: Mar. 6, 1989

Related U.S. Application Data

[63] Continuation of Ser. No. 35,763, Apr. 8, 1987, abandoned.

[30] Foreign Application Priority Data

Apr. 8, 1986 [FR] France .................................. 86 04963

[51] Int. Cl.⁵ ............................................ G08B 21/00
[52] U.S. Cl. ..................................... 340/606; 340/611; 73/744; 73/861.54; 200/82 E
[58] Field of Search ................ 340/606, 611; 73/744, 73/745, 746, 861.54, 861.53; 200/82 R, 82 E, 81.9 M, 81.9 HG; 116/70, 112, 261, 273; 137/101.21, 489.3, 538, 554, 558, 392, 393

[56] References Cited

U.S. PATENT DOCUMENTS

| | | | |
|---|---|---|---|
| 1,846,577 | 2/1932 | Barber | 73/861.54 |
| 4,166,936 | 9/1979 | Tice | 340/611 |
| 4,365,125 | 12/1982 | Keller | 200/82 E |
| 4,466,293 | 8/1984 | Huhtala | 73/861.54 |
| 4,500,759 | 2/1985 | deFasselle et al. | 200/82 E |
| 4,603,707 | 8/1986 | Gregoire et al. | 116/273 |
| 4,642,614 | 2/1987 | Cook | 340/606 |

Primary Examiner—Joseph A. Orsino
Assistant Examiner—Jill D. Jackson
Attorney, Agent, or Firm—Oblon, Spivak, McClelland, Maier & Neustadt

[57] ABSTRACT

A device and system for detecting the existance of fluid flow from a fluid source to a pipeline includes a cylinder with an inlet at a first end and a lateral outlet. A piston in the cylinder is moveable from a no-flow position abutting the first end in which it is maintained by a spring, to a flow position in which the piston at least partly opens the lateral outlet, by fluid flowing from the inlet to the lateral outlet. A magnetic switch detects the no-flow position of the piston, and actuates a radio transmitter to send a no-flow condition alarm. The device is used to detect interruptions in the supply of additives to oil and gas pipelines.

10 Claims, 2 Drawing Sheets

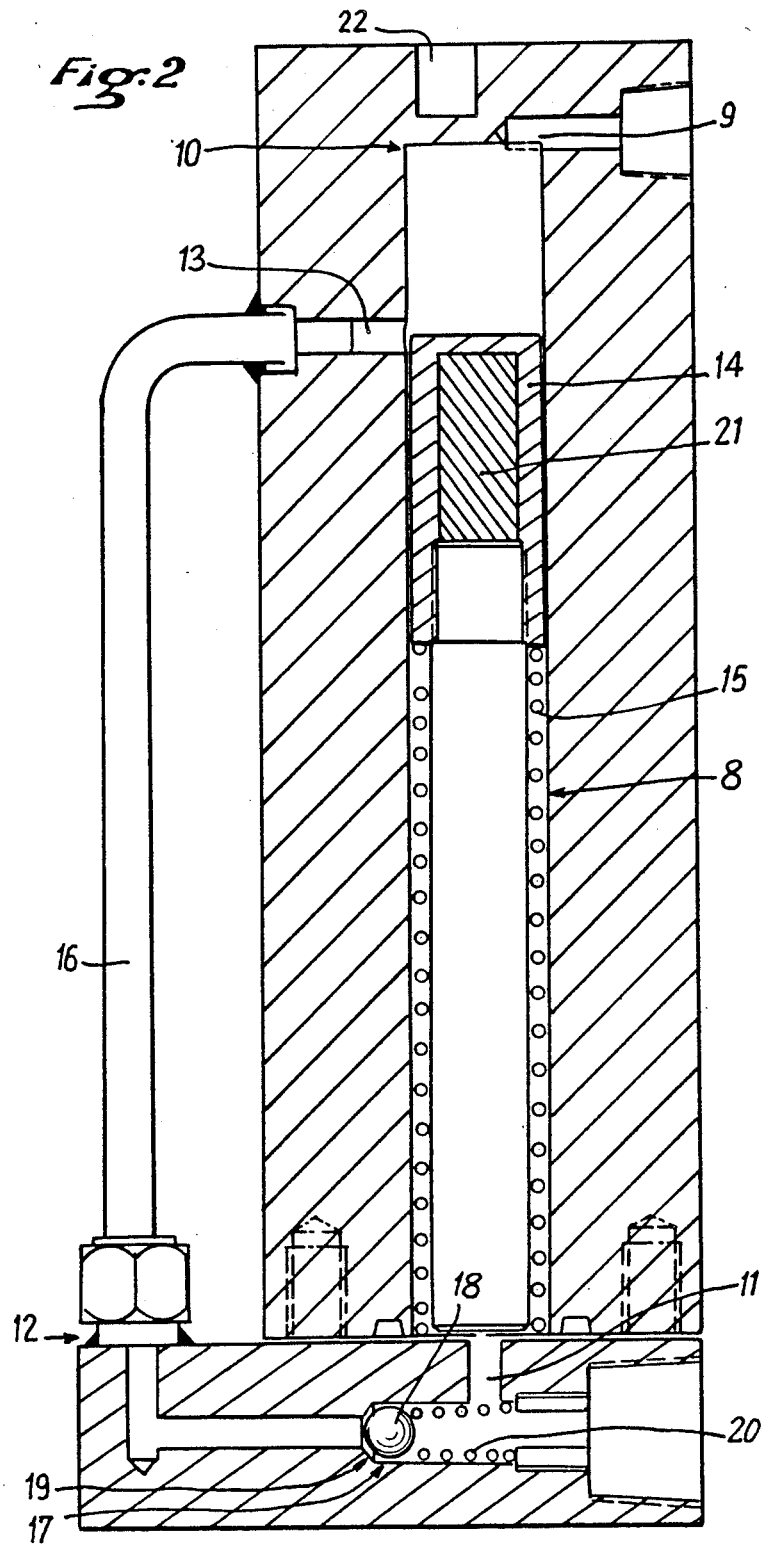

FLOW FAILURE DETECTOR

This is a continuation of application Ser. No. 035,763, filed Apr. 8, 1987, and now abandoned.

The present invention relates to a device for monitoring fluid flow and in particular for detecting the stoppage of such flow, which is important where additives are concerned which are injected continuously at points distributed along the length of a pipeline for conveying petroleum, gas or some other chemical product.

BACKGROUND OF THE INVENTION

Treatment of crude petroleum during its transfer from the production site to the storage location is of capital importance since the products injected make it possible to obtain an oil which complies with commercial specifications.

The detection of a stoppage of injection and the teletransmission thereof will make it possible to avoid expensive incidents such as might immobilise storage or reveal loads which are not in accordance with specifications.

The product is generally injected by means of an alternating or reciprocating pump driven by a motor supplied with gas or electricity. Faults in injection emanate either from a stoppage of the supply of gas or electricity or from a lack of product to be injected.

Flow monitors are known which are installed in a sleeve so that they can be mounted in a pipeline. A valve oscillating in the pipeline indicates the excess or lack of flow. However, these devices are designed to monitor considerable flow levels at pressures which are not very high and they are not suitable for clearly and manifestly detecting any absence of flow and do not therefore constitute a solution to the problem posed.

Flow meters are known which have a float and which comprise a vertical measuring cone of upwardly increasing cross-section and inside which there is a float. When fluid is flowing from the bottom upwards through the cone of measurement, the float rises and assumes such a position that the ascending force due to the flow balances the weight of the float. A level of flow through this instrument corresponds to every position of the float. If the tube is transparent, graduations are marked on the tube and make it possible directly to read the rate of flow. If the tube is opaque, a magnetic bar is placed in the float and a detector is provided to read any modification in magnetic field, translating these indications into a dial reading by means of a movable needle.

Float-type flow meters are fragile and are rather more laboratory instruments rather than work site equipment.

SUMMARY OF THE INVENTION

It is to offset the difficulties encountered with these various items of equipment that it has been proposed to have a compression spring work under the action of the pressure developed by the flowing fluid, which will permit use of high pressures.

A device according to the invention, for monitoring a fluid flow, consists of a cylinder (8) provided with an inlet orifice (9) on a first end (10), a circulating orifice (11) on a second end (12) and a lateral orifice (13) referred to as the outlet, and a piston (14) adapted for translatory movement in the cylinder (8) from a first position referred to as the no-flow position, in which the piston (14) is maintained abutting against the first end (10) of the cylinder (8) by a spring (15) bearing on the second end (12) of the cylinder (8), to a second so-called flow position in which the piston (14) compressing the spring (15) under the pressure of fluid arriving through the orifice (9) in the first end (10), opens up at least a part of the lateral outlet orifice (13), the cylinder (8) and the piston (14) being provided with associated means for detecting the first position of the piston. In such a device, the lateral orifice (13) is connected to an oil pipeline (6) successively through a pipe (16) provided with a non-return valve (17) and a connecting pipe (5), the orifice (11) of the second end (12) of the cylinder (8) being connected to the pipe (16) beyond the non-return valve (17).

According to a preferred embodiment, the piston (14) and the first end (10) of the cylinder (8) are provided with means whereby the arrival of fluid through the inlet (9) on the first end (10) applies the pressure of the fluid to the entire end of the piston (14) abutting on the first end (10) of the cylinder (8). These means consist in particular of the substantially spherical cup or concave curvature given to the end of the piston (14) co-operating with a first flat end (10) of the cylinder (8).

According to various embodiments, the means for detecting the first position of the piston consist of the association of a magnetised bar disposed within the piston and coaxially of the latter, and a magnetic contractor disposed on the plate constituting the first end of the cylinder, this magnetic contractor co-operating with a signal emitting device.

In such installations, the magnetic contactor is generally of the flexible blade or reed switch type and is often linked to a signal emitting device through a time delay relay.

The invention will be more clearly understood from the ensuing description given by way of non-limitative example and referring to an embodiment illustrated in the accompanying drawings.

BRIEF DESCRIPTION OF THE DRAWINGS

FIG. 2 shows a cross-section through the flow failure detector.

DESCRIPTION OF PREFERRED EMBODIMENT

Figure 1:
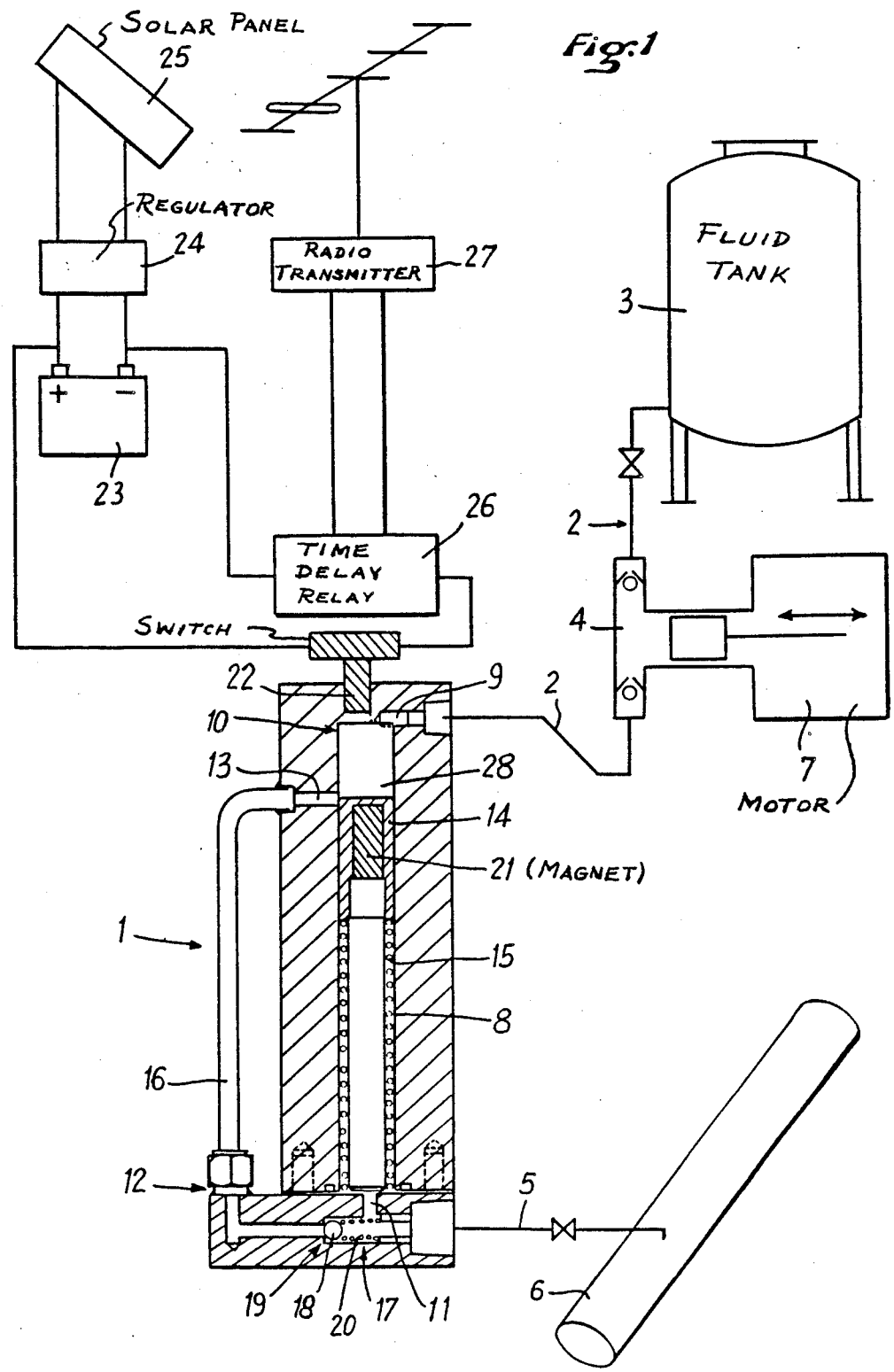
FIG. 1 shows a general diagram of the installation.

If reference is made to FIG. 1, this shows a flow monitoring device (1) incorporated between a pipe (2) connecting it to a tank (3) through an alternating pump (4) and a pipe (5) connecting it to an oil pipeline (6).

The alternating pump (4) is driven by a motor (7) driven either by electricity or by a liquid or gaseous fuel.

The flow monitoring device (1) consists of a cylinder (8) provided with an inlet (9) on a first end (10), a circulating orifice (11) on the second end (12) and a lateral so-called outlet orifice (13), and a piston (14).

The said piston (14) is adapted for translatory movement in the cylinder (8) from a first position, not shown but referred to as the no-flow position, in which the piston is maintained abutting the first end (10) of the cylinder (8) by a spring (15) bearing on the second end (12) of the cylinder (8), to a position shown in the drawing and referred to as the flow position, in which the piston (14) compressing the spring (15) opens up at least a part of the lateral orifice (13).

This lateral orifice (13) is connected to the pipe (5), itself terminating at the gas pipeline (6), by a duct (16) comprising a non-return valve (17) consisting of a ball (18) bearing on an annular seat (19) under the action of a spring (20).

The circulating orifice (11) on the end (12) of the cylinder (8) is connected to the pipe (16) downstream of the non-return valve (17).

The piston (14) comprises a coaxial magnetised bar (21).

Housed in the wall of the cylinder (8) bounded by the first end (10) is a magnetic contractor (22) of the flexible blade or read switch type.

This magnetic contractor (22) is supplied with electric power by a source such as a battery (23) which is itself connected to a solar panel (25) through a regulator (24).

The magnetic contactor (22) is connected to a radio transmitter (27) via a time delay relay (26).

The piston (14) has its end (28) abutting the first end (10) of the cylinder (8), which although it cannot be seen in the drawing, has the shape of a spherical cup allowing it to receive the pressure of the liquid arriving through the orifice (9) and over its entire surface area.

The piston (14) is adapted for movement in the cylinder (8) with a clearance determined as a function of the viscosity of the liquid in order to permit a certain leakage flow through the annular space which is thus defined.

By way of example, for viscosities comprised between 100 and 5000 centipoises, a clearance of 1/10th millimetre may be envisaged, while a smaller clearance must be observed for viscosities below 100 centipoises. The piston can also be fluid tight fit in the cylinder.

The piston (14) is made from a material which has as great a resistance to corrosion as the body of the cylinder but which is slightly different from the latter either in terms of its hardness or with regard to its surface condition, so that it can easily slide and avoid any seizure.

Its various parts of the detection device (1), with the exception of the magnetised bar or plug (21), are made from non-magnetic steel and offer excellent resistance to corrosion.

OPERATION OF THE DEVICE

The liquid arrives through the orifice (9) and immediately pressurises the assembly at the end of the piston (14).

The piston (14) is pushed back until the lateral orifice (13) is exposed at least partially to allow passage of the liquid through the pipe (16) towards the oil pipeline (6) via the non-return valve (17).

Under the effect of the pressure exerted by the liquid on the piston (14), despite the outflow through the pipe (16) and despite the leak tolerated by the annular space between the piston (14) and the cylinder (8), the piston (14) comes to rest in a position butting on the second end (12) of the cylinder (8), the effect of this being to stop the leakage through the annular space and to stabilise this position. The piston (14) is then in the flow position.

If there is a failure in injection, whatever the cause may be, the non-return valve (17) closes and, under the action of the spring (15), the piston (14) moves until it abuts the end (10) of the cylinder (8).

By virtue of the tolerated leakage between the piston (14) and the cylinder, the non-return valve (17) closes prior to complete stoppage of fluid flow, the effect of this being to moderate the speed of displacement of the piston.

When the piston (14) approaches this position of abutment against the end (10), the magnetic bar (21) actuates the magnetic contactor (22) so initiating the alarm process.

Bearing on the end (10), the piston (14) is then in the no-flow position, in which it will remain until such time as the injection means feed to the orifice (9) in the cylinder a flow of fluid of sufficient pressure to overcome the thrust of the spring (15) on the piston (14).

The time delay relay (26) blocks the emission of a radio alarm by the transmitter (27) for a lapse of time corresponding to a limited irregularity of amplitude in the operation of the pump (4).

Once this time lapse has passed, the radio alarm operates and a maintenance crew can be sent to attend to the station where additive is injected into the oil pipeline (6).

Under conditions of normal operation of the injection station, the electrical consumption of the no-flow detection device is nil. This constitutes a considerable advantage, allowing supervision from one battery, essentially supplied by a solar receiver, and in any case independently of variations in supply by an electrical mains system.

We claim:

1. Device for detecting the existance of fluid flow from a fluid source to a pipeline comprising, a cylinder having a first end and a second end, said cylinder having an inlet adjacent said first end and an outlet spaced from said inlet, said inlet being connected to the fluid source, a piston having a forward end and a rearward end and moveable in translation in said cylinder, to a first position in which said forward end of the piston is between said inlet and said outlet and the outlet is substantially closed, and a second position spaced from said first end in which said outlet is at least partly open and fluid can flow from said inlet to said outlet, said piston being moveable from said first position to said second position by fluid from said source flowing from said inlet to said outlet, spring means in said cylinder for urging said piston toward said first position in the substantial absence of fluid flow from said inlet to said outlet, duct means connecting said outlet to said pipeline, a non-return valve in said duct means to prevent return flow of fluid from said pipeline to said outlet, an orifice in said cylinder beyond said outlet, passage and means connecting said orifice to said duct means at a location downstream of said non-return valve, and means for detecting displacement of the piston to said first position.

2. A device according to claim 1, wherein said orifice comprises a circulating orifice and said device comprises means defining a flow passage for leaking fluid at a very low rate from said forward end to said rearward end of said piston and to said circulating orifice.

3. A device according to claim 2, further comprising means on said piston for closing said circulation orifice upon movement of the piston to said second position.

4. A device according to claim 3, wherein, said circulating orifice is adjacent said second end of said cylinder, and said means on said piston for closing said orifice comprises a portion of the piston adjacent the rearward end of the piston.

5. A device according to claim 2, wherein said flow passage for leaking fluid at a very low rate comprises, a leakage clearance between the piston and the cylinder.

6. A device according to claim 1, wherein said forward end of said piston and said inlet cooperate to provide means for applying the pressure of fluid from said source to the entire forward end of said piston while said forward end abuts said first end of the cylinder, so that fluid under pressure can enter said inlet while the piston abuts the first end of the cylinder.

7. A device according to claim 6, wherein the forward end of said piston has a spherical cup shape.

8. A device according to claim 1, further comprising, signal emitting means outside said cylinder, and a magnet carried by said piston, said cylinder comprises a cylinder having a portion thereof of non-magnetic material, and said means for detecting the position of said piston comprises a magnetically actuated switch outside said cylinder and adjacent said first end thereof for operating said signal emitting means in response to movement of the piston to said first position.

9. A device according to claim 8, wherein said non-magnetic portion of the cylinder comprises said first end of the cylinder, said magnet comprises a magnet at the forward end of the piston, and said magnetically actuated switch comprises a reed switch adjacent said first end of the cylinder.

10. A device according to claim 8, further comprising, time delay means for delaying operation of said signal emitting means for a predetermined interval of time after actuation of said switch means.

* * * * *